United States Patent [19]
Patte

[11] Patent Number: 4,735,637
[45] Date of Patent: Apr. 5, 1988

[54] METHOD FOR DENATURING PAINTS

[75] Inventor: Philippe Patte, Nancy, France

[73] Assignee: Air Industrie Systemes, France

[21] Appl. No.: 20,990

[22] Filed: Mar. 2, 1987

[30] Foreign Application Priority Data

Nov. 20, 1986 [FR] France ............... 86 16300

[51] Int. Cl.⁴ ............................. B01D 53/14
[52] U.S. Cl. .......................... 55/84; 55/89;
55/228; 55/229; 55/DIG. 46; 98/115.2;
118/326; 427/444
[58] Field of Search ............ 55/84, 89, 228, 229,
55/240, DIG. 46; 98/115.2; 118/326; 427/195,
444

[56] References Cited
U.S. PATENT DOCUMENTS 4,039,304 8/1977 Bechthold et al. ............ 55/89 X
4,257,784 3/1981 Gebhard et al. .............. 55/84
4,293,318 10/1981 Bertini et al. ............... 55/89 X
4,444,573 4/1984 Casper et al. ............. 98/115.2 X
4,496,374 1/1985 Murphy ...................... 55/84
4,582,515 4/1986 Eneroth et al. ............. 55/89
4,629,477 12/1986 Geke ......................... 55/89 X Primary Examiner—Charles Hart
Attorney, Agent, or Firm—Larson and Taylor

[57] ABSTRACT

A process is provided for denaturing paints which are collected in paint rooms of the type comprising a scrubber in which air charged with droplets of paint is brought into contact with a scrubbing liquid. An additive in the form of an expanded polyurethane powder is included in the scrubbing liquid. The apparatus includes an arrangement for injecting the expanded polyurethane powder into the scrubbing liquid at the top of the scrubber.

10 Claims, 1 Drawing Sheet

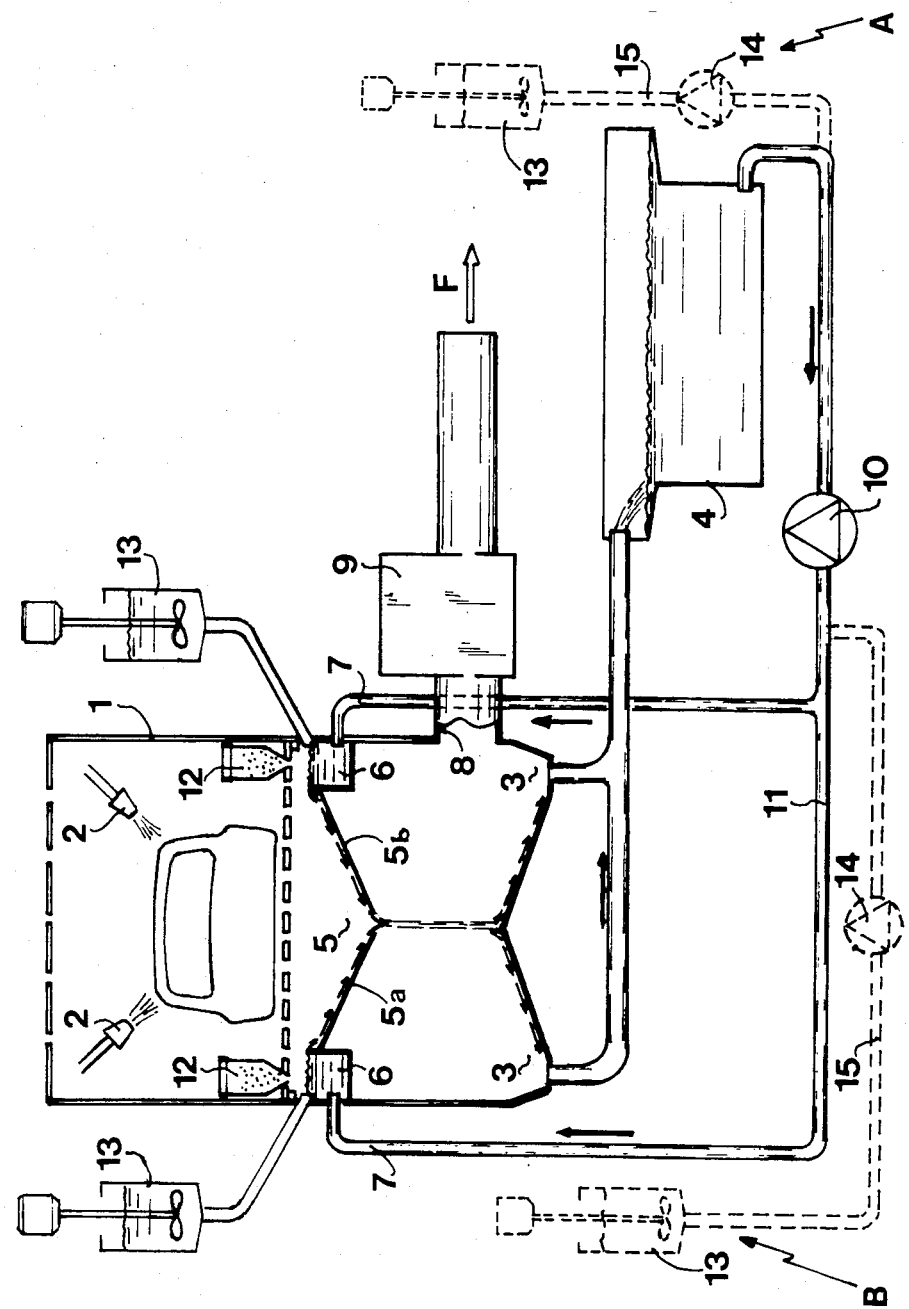

METHOD FOR DENATURING PAINTS

FIELD OF THE INVENTION

The present invention relates to a process or method for denaturing paints which are collected in paint rooms wherein a scrubber in which air charged with droplets of paint is placed in contact with a scrubbing liquid to which a powdered auxiliary substance has been added. The invention also concerns an apparatus or installation for implementation of the method or process.

BACKGROUND OF THE INVENTION

In known processes, articles are painted by application of powder to an article to be painted which is then passed through a pointing room. This method of paint application obviously involves considerable loss of paint, including, but not limited to paint deposited on the walls and the floor of the painting room.

These paint deposits must be continuously eliminated in order to avoid frequent interruption of the operation of the room necessary to permit long and tedious cleaning of the walls and floor of the room to be carried out, particularly by scraping off of the deposited paint. To prevent the formation of these deposits, air charged with droplets of paint is forced into the room across a scrubber provided with a curtain of scrubbing liquid, so that these droplets are transferred from the air to this liquid. The liquid, charged with the paint picked up thereby, flows through one or more channels placed beneath the room to a collection tub or basin wherein the paint is separated from the scrubbing liquid, the latter being recycled into the room to feed the scrubber.

The scrubbing liquids which are most often used in such processes are constituted by a solution of chemical products which have an alkaline reaction with water, and the liquids which are then obtained are used to denature the collected paints, in other words, to cause the paints to lose the adhering power thereof and thus enable ready separation of the paints from the remaining liquid. This is traditionally followed by a separation of the scrubbing liquid and the collected paint in the collection tub, so as to enable recycling of the scrubbing liquid as mentioned above. According to whether the collected paint floats to the surface of the tub or decants at the bottom, the next step is either a separation step comprising skimming of the surface or a separation step involving scraping of the bottom of the tub by appropriate known devices.

Different types of alkaline or neutral denaturant compositions are known, including, but not being limited to, the following:

organic solvents (aliphatic or aromatic hydrocarbons, alkyl-ketones); and nonionic moistening or emulsifying agents (ethylene and alcohol oxides and alcohols or phenol-alkyls, for example).

Scrubbing liquids are also known wherein clays, such as bentonite, are added to overcome the adhering power of the paint and to increase the dispersion thereof.

A further method or process is known which provides for precipitation of lacquers of synthetic resin base using water as scrubbing liquid, made of alkaline and containing an additive constituted of an aqueous dispersion of wax, providing coating of the droplets with lacquer.

These known compositions of scrubbing liquids give satisfactory results with traditional paints, such as glycerophthalic and acrylic paints and finishes. The adhering power of such paints is reduced but, in the scrubbing liquid collection tub, a part of the paint floats to the surface, a part decants, and a part remains in suspension in the liquid phase, and this makes it difficult to collect the paint and to clean the scrubbing liquid.

Presently, in the automobile paint industry, new types of paints are used to limit release of organic solvents into the atmosphere. Such paints can include paints with a high dry portion, polyester paints, and paints including two compounds. These paints are very difficult to denature, which leads users of paint rooms to increase the concentration of chemical products in the scrubbing liquids. As a result, it is not unusual to have scrubbing liquids which are so charged with soluble organic materials that they cannot be recycled, thereby obligating the user to discard all of the liquid. Moreover, because these types of paint are difficult to denature, and thus the paint rooms become rapidly caked with the paints, users of such paints are required to undertake frequent, time consuming, tedious and onerous cleanings.

SUMMARY OF THE INVENTION

The purpose of the method or process of denaturation which is the object of the invention is to remedy these drawbacks, to allow satisfactory denaturing of the paints, including paints of the new types used in the automobile industry, and to allow simple separation of the collected paint from the scrubbing liquid for the purpose of recycling the scrubbing liquid.

Accordingly, an object of the invention is the provision of a process for denaturing paints collected in paint rooms comprising a scrubber in which the air charged with droplets of paints is placed in contact with a scrubbing liquid to which another substance has been added, wherein this added substance comprises an expanded polyurethane powder.

Another object of the invention concerns the provision of an installation or apparatus for implementation of the process, this apparatus comprising a spray tunnel, a scrubber for collection of the paint droplets in which paint charged air is placed in contact with a scrubbing liquid, scrubbing liquid feed channels situated on either side of the scrubber for feeding scrubbing liquid to the scrubber, further channels for recovering the scrubbing liquid and for carrying the liquid to a collection tub, and a recycling means for recycling the scrubbing liquid from the collection tub to the feed channels and the appratus beng characterized by the provision of a means for introducing expanded polyurethane powder into the scrubbing liquid at the top of the scrubber.

Other objects, features and advantages will be set forth in, or apparent from, the detailed description of an exemplary, non-limiting embodiment which follows.

BRIEF DESCRIPTION OF THE DRAWINGS

The single FIGURE of the drawings is a diagrammatic representation of a paint room comprising a trickle scrubber arrangement in accordance with the invention, by means of which the process according to the invention can be carried out.

DESCRIPTION OF THE PREFERRED EMBODIMENTS

The paint room shown in the drawings basically comprises a spray tunnel 1, through which the articles, for example automobile bodies, which are to be painted by a plurality of spray heads 2, are passed and a plurality of recovery conduits or channels 3 which are placed beneath tunnel 1 and which open into a collection tub or basin 4.

Under tunnel 1, and along the entire length thereof, there is provided a scrubber device or scrubber 5 to collect the fine droplets of paint which are dispersed in the air in the tunnel 1 during the spray paint application. This scrubber 5 comprises two inclined walls 5a and 5b, arranged in a V shape, down which a scrubbing liquid is made to stream or trickle, which eventually flows into recovery channels 3, by passing between the two spaced bottom edges of the two inclined walls 5a and 5b. The scrubbing liquid is fed onto these two walls 5a and 5b through two lengthwise channels or conduits 6 arranged along the edges thereof, channels 6 being fed in turn by further condiuts 7. The air charged with fine droplets of paint, which is generated in tunnel 1, is sucked through an orifice 8 which opens beneath tunnel 1, and is discharged to the outside, in the direction of arrow F, after having passed through a debubbler 9, which forces charged air to pass through the curtain of scrubbing liquid which trickles on the inclined walls 5a and 5b of the scrubber 5. As a result, the paint droplets are transferred from the air into this liquid and are evacuated from the paint room through channels 3.

The paint room also includes a pump 10 for recycling the scrubbing liquid. The suction side of the pump 10 is connected to the bottom of collection tub 4 and the discharge side thereof to a conduit 11 which feeds the two feed channels 6 through conduits 7. The point room further comprises one or more funnels 12, provided with dosing outlets at the bottom thereof, placed over channels 6. These funnels contain a solid powder material as discussed above.

The solid powder material used for implementation of the method or process of the invention is the powder obtained by powdering expanded polyurethane, commonly known as polyurethane foam, of a mass volume lower than 1000 kg/m$^3$ and preferably between 80 and 200 kg/m$^3$. The granulometry (grain size) of the powder is smaller than or equal to 1 mm and preferably smaller than 0.8 mm.

The operation of the room in which the process of the invention is carried out will now be described.

Collection tub 4 is filled with a scrubbing liquid comprising water, and the recycling pump 10 is started up to feed the liquid to channels 6 and scrubber 5. As soon as the paint is sprayed on the articles to be painted in tunnel 1, the polyurethane powder is injected through funnels 12 into the feed channels 6 disposed at the top of inclined walls 5a and 5b of the scrubber 5. The polyurethane powder carried by the scrubbing liquid, and the fine droplets of paint which are not depositied on the articles to be painted, are placed in close contact in scrubber 5 so that the paint droplets agglomerate with the granules of expanded polyurethane powder, and are carried by the scrubbing liquid toward recovery channels 3 and from channels 3 to the collection tub 4 wherein the agglomerated droplets float to the surface of the scrubbing liquid. A conventional scraping device (not shown) removes the paint agglomerated with the expanded polyurethane powder floating on the surface of the scrubbing liquid contained in collection tub 4. The scrubbing liquid with collected paint removed therefrom is then recycled to the paint room by means of pump 10.

It is noted that it is also possible to place the expanded polyurethane powder in suspension in the scrubbing liquid in at least one tub 13. The contents of tub 13 is stirred, and the suspension is caused to pour out by gravity or by means of a pump (not shown), into one of the channels 6, or into the two of the channels 6, to feed scrubber 5.

In another variation, indicated in dashed lines at the right of the single FIGURE of the drawings, a stirring tub 13, containing the expanded polyurethane powder suspension in the scrubbing liquid, is connected through a length of tubing 15 incorporating a pump 14, either to the suction conduit (suction side) of recycling pump 10, or to the conduit 11 used to discharge pump 10. These two modifications are shown in dashed lines in the drawings at A and B, respectively.

Whatever injection methods or devices are used, it is to be noted that the expanded polyurethane powder is always introduced at the top of scrubber 5.

Numerous tests carried our with different types of paint have shown that satisfactory results are obtained with the method and apparatus described above. In particular, it has been found that at least 95% by weight of the paint transferred to the scrubbing liquid in scrubber 5 is recovered in flotation on the surface of collection tub 4 (the recovered paint having lost its adhering power) when the weight ratio of the weight of injected expanded polyurethane powder to the weight of paint passing through scrubber 5 is equal to or greater than 0.3, or when the weight ratio of the weight of injected expanded polyurethane powder to the weight of dry paint extract passing through the scrubber is equal to or greater than 0.5.

Other tests have shown that substantially identical results are obtained when the scrubbing liquid is constituted of water made alkaline (approximately pH 9) by the addition of alkaline chemical agents.

The advantages obtained by the process and the installation of the invention include the following:

all of the paint recovered in the collection tub floats with the expanded polyurethane powder to the surface of the scrubbing liquid contained in this tub, which allows the paint to be removed by means of a simple surface scraper;

the paint floating on the surface of the collection tub with the expanded polyurethane powder forms a nonadherent layer which is easy to dry out following the extraction thereof from the tub, thereby diminishing its volume and making it pelletize and therefore easy to handle, thus simplifying its removal;

the process provides excellent results with paints which are difficult to denature such as polyester paints, high dry portion paints, paints of two compositions, and lacquers;

the polyurethane powder used in the process is an inexpensive material and can, for example, be obtained by powdering scraps of expanded polyurethane used in heat insulation;

the implementation of the process in existing paint rooms is easy to accomplish and is economical since all that is required is to install either funnels or the like containing the expanded polyurethane powder disposed over the feed channels of the scrubber, or to employ one or more stirred tubs, containing the expanded polyurethane powder in suspension in the scrubbing liquid, and feeding the suspension to the feed channels of the scrubber, either directly, or through the recycling circuit of the scrubbing liquid; and implementation of the process is also possible in the paint rooms wherein the scrubbing liquid is constituted of water made alkaline by addition of alkaline chemical products.

Although the present invention has been described relative to exemplary embodiments thereof, it will be understood by those skilled in the art that variations and modifications can be effected in these exemplary embodiments without departing from the scope and spirit of the invention.

I claim:

1. In a process for denaturing paints collected in paint rooms comprising a scrubber in which air charged with paint droplets is brought into contact with a scrubbing liquid including an additive, the improvement wherein said additive comprises expanded polyurethane powder.

2. A process as claimed in claim 1 wherein the polyurethane powder is obtained by powdering expanded polyurethane of mass volume less than 1000 kg/m$^3$.

3. A process as claimed in claim 2 wherein said mass volume is between 80 and 200 kg/m$^3$.

4. A process as claimed in claim 1 wherein the granulometry of the expanded polyurethane powder is smaller than 1.0 mm.

5. A process as claimed in claim 4 wherein said granulometry is smaller than 0.8 mm.

6. A process as claimed in claim 1 wherein the weight ratio of the weight of expanded polyurethane powder to the weight of the paint passing through the scrubber is equal to or greater than 0.3.

7. A process as claimed in claim 1 wherein the weight ratio of the weight of expanded polyurethane powder to the weight of the dry paint portion of the paint passing through the scrubber is equal to or greather than 0.5.

8. A process a claimed in claim 1 wherein the expanded polyurethane powder is introduced into the scrubbing liquid at the top of the scrubber.

9. A process as claimed in claim 1 wherein the expanded polyurethane powder is placed in suspension in the scrubbing liquid before being introduced into the scrubber.

10. A process as claimed in claim 1 wherein the expanded polyurethane powder is placed in suspension in the scrubbing liquid and the suspension is introduced into recycled scrubbing liquid.

* * * * *